Oct. 1, 1929.  C. A. WHITING  1,730,105
BRACELET CHAIN
Filed March 30, 1928
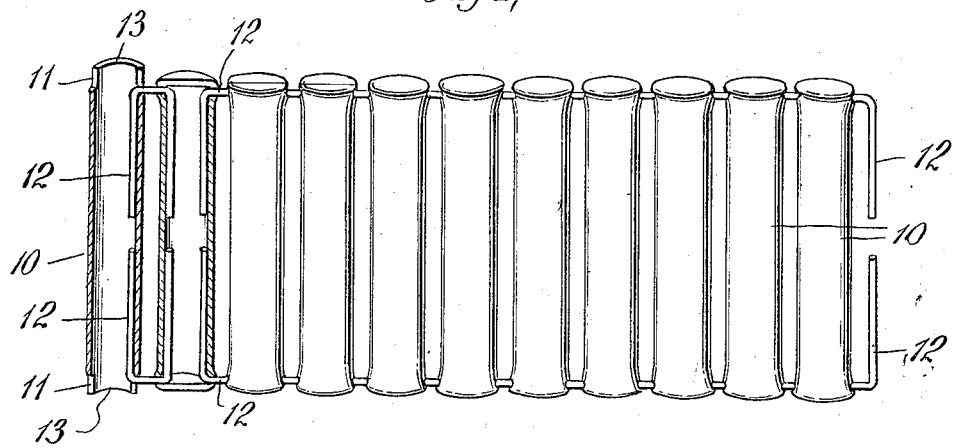
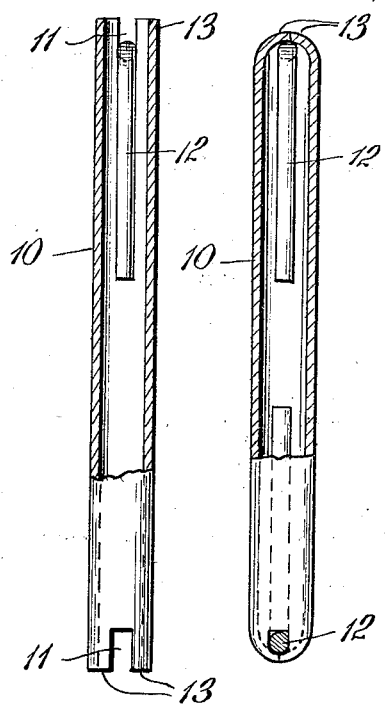
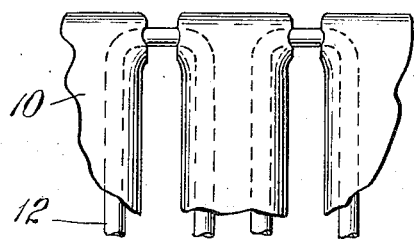
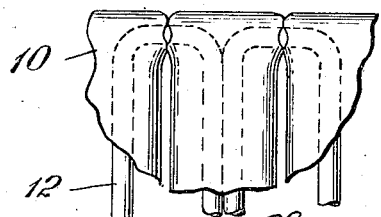
INVENTOR
Charles A. Whiting
BY
Bennie, Davis, Marvin Edmonds
ATTORNEYS Patented Oct. 1, 1929

1,730,105

UNITED STATES PATENT OFFICE

CHARLES A. WHITING, OF FRANKLIN, MASSACHUSETTS, ASSIGNOR TO WHITING & DAVIS COMPANY, A CORPORATION OF MASSACHUSETTS

BRACELET CHAIN

Application filed March 30, 1928. Serial No. 265,832.

This invention relates to bracelet chains and has particular reference to the laterally rigid band type of bracelet chain used for holding a wrist-watch or as a bracelet, and the method of making such a chain. As such chains are now made, elaborate stamping and forming processes are necessary in order to make the several links interlock without showing the interlocking means, or the locking means where visible must be made of the same or similar metal of which the links are made in order to present a sightly appearance. These requirements make a comparatively simple chain expensive and its manufacture more complicated than the nature of the device warrants.

It is the object of this invention to provide a bracelet chain which is simple in structure, strong and of pleasing appearance, and which may be cheaply and easily produced by a method of manufacture which does not require elaborate machines or especially skilled artisans.

The bracelet chain of this invention comprises a plurality of flexibly joined tubular links of circular, oval, polygonal or other cross-section, which may be made by severing equal lengths from tubular metal stock. The joining means for the several links consist of suitable staples of wire, the several prongs of which are introduced into the open ends of adjacent links, the ends of these links having been previously slotted by saw-cutting or the like, so that the base of each staple lies in these slots below the end surfaces of the links, while the prongs of the staple are long enough to overlie a portion of the inside surface of the links in order to brace the chain laterally whereby the desired lateral rigidity is obtained. The prongs of the staples are spaced apart sufficiently to allow a relative movement between the adjacent links which each staple joins, so that the chain becomes extensible and contractable. After the staples have been positioned in the manner described, the two projections formed at the end of each link by the slot containing the staple, are bent toward each other by a swaging operation or the like so that the open ends of the links are closed and the staples are non-rigidly confined in position. The links are thus practically invisible so that they may be formed from inexpensive wire, and the chain appears to consist of a plurality of closed cylindrical links of uniform shape and pleasing appearance, being finished in gold, silver, platinum, enamel, or the like.

For a better understanding of the invention, reference is made to the accompanying drawings, in which Figure 1 is a perspective view of the new bracelet chain, shown partially in section;

Fig. 2 is an edge view thereof;

Fig. 3 is an enlarged, partial longitudinal section of one of the links before the swaging operation;

Fig. 4 is an enlarged, partial longitudinal section of one of the links after the swaging operation; and Figs. 5 and 6 are enlarged fragmentary views of the chain in extended and contracted positions respectively.

In these drawings, numeral 10 designates one of the links before being formed with other links into the chain. These links may be conveniently made by severing from tubular stock equal pieces of a length slightly greater than the intended width of the finished chain. The tubular stock used is of any suitable malleable metal, either solid or gold, silver or otherwise plated, or it may be of base metal to be plated or enameled in the finished state. These tubular links may be of any cross-sectional shape such as round, oval, polygonal or the like, a link of oval cross-section being illustrated in the drawings.

The ends of the links 10 are slotted as shown at 11 by saw-cutting or the like to a depth determined by the diameter of the wire staples 12 to be inserted in these slots plus a sufficient length of the remaining projections 13 to close the end of the link when swaged over. The width of the slot is slightly greater than the diameter of the staple wire in order to allow a certain amount of play of the staple in the slot. As shown in the drawings, the slot 11 extends across the long diameter of the oval cross-section, so that the projections 13 must be equal to at least half of the short diameter of the oval cross-section in order that the ends of the links may be completely closed by swaging, i. e., so that the outer edges of the projections 13 meet at the center of the end of the link.

The staples 12 may be made of metal wire cut off in suitable lengths and bent into a U shape, the space between the prongs of each staple being greater than double the thickness of the link metal in order that a certain amount of play between links is allowed. The staples are also formed so as to have relatively long prongs. The prongs of the staple 12 are inserted into each end of the adjacent links 10 so that the base of the staple falls into slots 11 of the adjacent links in the manner illustrated particularly in Figs. 1, 2 and 3. This is done for as many links as are necessary to produce a chain of the required length, and this length remains the same when the chain is completed. When the staples are thus placed in the slot 11 their prongs extend into the interior of the tubular links so as to overlie a substantial length of the interior surface as shown in Figs 1, 3 and 4.

The final operation is a swaging operation in which the two opposite projections 13 formed on the ends of each link by the slot 11 are bent over or swaged toward each other so that they come together to close the end of the link and at the same time to enclose and non-rigidly secure the staple 12 in position. This swaging operation flattens the two curved projections 13, so that when the straight ends of these projections are brought together they coincide to make a tight and even joint so that the junction of these projections is scarcely visible. The flattening of the curved projections 13 results in widening them so that when they are brought together, a slight flare appears at the ends of each link, as is illustrated in Figs. 1, 5 and 6.

The spacing between the flaring portions of adjacent links determines the amount of relative movement between adjacent links, and the extensibility and contractability of the completed chain is determined by the total width of all the spaces between the links. The staples 12 are slidable in the side slots of the adjacent links, and when the chain is extended it appears as illustrated in Fig. 5, while Fig. 6 illustrates the chain in contracted position. While it is preferable that only a short length of the staples 12 is visible between the links, the extensibility of the chain may be increased by widening the spacing between the prongs of the staples 12 up to the point where the prongs of the staples in adjacent links engage each other when the adjacent links engage each other in the manner illustrated by Fig. 6. The long prongs of the staples which overlie a substantial length of the interior surfaces of the links, brace the links against relatively longitudinal movement, so that the chain has the lateral rigidity required of a chain of this type.

The requisite degree of bending of the chain at right angles to its flat surface is determined jointly by the amount of endwise play allowed the staples 12 in the slots 11, and the width of the interior of each link. The slots 11 are made slightly wider than the diameter of the staple wire and, in the oval section form of links described, the staple may pivot more freely about a center between the adjacent links the nearer its prongs are to the center of these links, because the link widens toward the center. In other words, the chain will bend to a greater extent when it is contracted than when it is extended.

It will be seen that the new bracelet chain and the method of making the same provide an extremely simple and inexpensive article of jewelry which presents an attractive appearance and is strong and durable. While a particular form of the bracelet chain has been illustrated and described, the method of making the chain may be as readily applied to materials of various shapes and kinds, and the finished product may be chased, embossed, enamelled or otherwise decorated to suit the requirements of use.

I claim:—

1. A chain comprising a plurality of elongated links, each of said links having a central opening in each end and a slot communicating therewith, connecting members lying in the slots of adjacent links to join them in parallel relationship, ends of the links defining the walls of the slots being bent over the connecting members to secure them in position, the connecting members and the slots being so arranged with respect to the links that the chain is flexible to move transversely in either direction but is substantially rigid in a direction longitudinal of the links.

2. A chain comprising a plurality of tubular links, each link having two projections of substantially equal length to one another on each end, and a U-shaped connecting member lying between the projections on the corresponding ends of each adjacent link with the projections being bent over the U-shaped connecting member to hold it in place.

3. A chain comprising a plurality of elongated tubular links, each of said links having a plurality of spaced diametrically opposed openings in the sides thereof, separate connecting means positioned in each of the corresponding openings of adjacent links to join them together in parallel relationship, said links projecting outwardly adjacent the openings to a greater extent than the remainder of the adjacent walls of corresponding links, whereby the links are held out of contact with one another except at the point of projection.

In testimony whereof I affix my signature.

CHARLES A. WHITING.